United States Patent
Kunz

(10) Patent No.: US 8,250,990 B2
(45) Date of Patent: Aug. 28, 2012

(54) MAGNETIC LEVITATION TRAIN PROVIDED WITH AN EDDY-CURRENT BRAKE

(75) Inventor: Siegbert Kunz, Miesbach (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 700 days.

(21) Appl. No.: 10/592,818

(22) PCT Filed: Mar. 12, 2005

(86) PCT No.: PCT/DE2005/000456
§ 371 (c)(1),
(2), (4) Date: Jul. 2, 2008

(87) PCT Pub. No.: WO2005/090113
PCT Pub. Date: Sep. 29, 2005

(65) Prior Publication Data
US 2008/0257662 A1    Oct. 23, 2008

(30) Foreign Application Priority Data
Mar. 19, 2004   (DE) .......................... 10 2004 013 994

(51) Int. Cl.
*B60L 13/04*   (2006.01)
*B60L 7/00*   (2006.01)
*B61C 11/00*   (2006.01)
(52) U.S. Cl. ............................ 104/282; 105/77; 188/158
(58) Field of Classification Search .................. 104/281, 104/282; 105/73, 77; 188/158, 164, 165
See application file for complete search history.

(56) References Cited

U.S. PATENT DOCUMENTS

| 1,782,192 A | | 11/1930 | Brownyer |
| 3,723,795 A | * | 3/1973 | Baermann .................... 310/93 |
| 4,341,290 A | | 7/1982 | Baermann |
| 4,359,247 A | | 11/1982 | Miller |
| 4,484,666 A | | 11/1984 | Steinmetz et al. |
| 4,698,895 A | | 10/1987 | Miller et al. |
| 5,053,654 A | | 10/1991 | Augsburger et al. |
| 6,085,663 A | * | 7/2000 | Powell et al. ............... 104/281 |
| 6,412,611 B1 | | 7/2002 | Pribonic |
| 6,629,358 B2 | | 10/2003 | Setiabudi et al. |

FOREIGN PATENT DOCUMENTS

| DE | 30 04 705 | 8/1981 |
| DE | 39 17 058 | 11/1990 |
| DE | 39 28 277 | 12/1990 |
| WO | 97/30504 | 8/1997 |

OTHER PUBLICATIONS

Zevrail Glasers Analen, Special Edition Transrapid, October 2003, p. 63 (With Eng. Translation).

* cited by examiner

*Primary Examiner* — S. Joseph Morano
*Assistant Examiner* — R. J. McCarry, Jr.
(74) *Attorney, Agent, or Firm* — Michael J. Striker

(57) ABSTRACT

A magnetic levitation railway having an eddy-current brake (20) cooperates with a reaction rail (8) of the driveway (2). The eddy-current brake (20) has at least one brake magnet (21) which is movably mounted to the vehicle (1) and transversely to the reaction rail (8) and which is made to abut the reaction rail (8) if a normal force, for example, fixed by means of springs (27) is exceeded.

6 Claims, 4 Drawing Sheets

MAGNETIC LEVITATION TRAIN PROVIDED WITH AN EDDY-CURRENT BRAKE

BACKGROUND OF THE INVENTION

The invention relates to a magnetic levitation railway and to a magnetic levitation vehicle therefor.

Known magnetic levitation railways of this type are driven, for example, by long-stator linear motors which are provided with three-phase alternate current windings laid in a long stator alongside the guideway. The excitation field of the linear motors is supplied by carrier magnets simultaneously acting as excitation magnets and arranged in the vehicle (DE 39 19 058 C2). Apart from driving, the linear motors can also be utilized for braking the vehicles. For this purpose, it is merely necessary to feed an electric current with a sign opposite to the usual operation during travel into the three-phase alternate current windings of the relevant long stator.

Since there does not exist any possibility of braking when e.g. individual magnets or all carrier and excitation magnets fail to work, magnetic levitation vehicles destined to run at high speed are additionally equipped with a so-called "safe" brake, which for example may be a compressed-air brake (DE 30 04 705 C2). As magnetic levitation vehicles are in any case provided with carrier and guide magnets, it lends itself to utilize an eddy-current brake also comprised of magnet arrangements to serve as a safe brake, which is true for a magnetic levitation railway of the species designated hereinabove (e.g. ZEVrail Glasers Annual Reports, Special Edition Transrapid, October 2003, Page 63) At pre-selected positions, such an eddy-current brake is provided with brake magnets which co operate with electrically conductive, laterally arranged guiding and/or reaction rails, are mounted at the guideway and generate eddy currents therein acting as a brake. A disadvantage is that the normal forces additionally generated by the brake magnets vertically to the reaction rails increase as the speed of the vehicle decreases, particularly if the eddy-current brakes are regulated to a constant brake force and therefore call for ever greater currents to maintain the desired brake forces, the more the vehicle speed decreases. Consequently, the forces acting upon the reaction rails increase so much that they exceed admissible, critical values and may thus cause damage to the mechanical anchoring of the reaction rails. Up to now it has only been possible to remedy this situation by reinforcing the mechanical structure of the guideway accordingly.

SUMMARY OF THE INVENTION

The problem to be solved by the present invention is to configure the magnetic levitation vehicle of the species designated hereinabove so as to ensure that the brake magnets of the eddy-current brake do not exert any unwanted great normal forces on the reaction rails even when travelling at low speed.

The present invention bears the advantage that the brake magnets during slow speed are applied to the reaction rails due to the normal forces which might rise beyond a pre-selected limit value. Thereby the normal forces lose their effect, i.e. the reaction rails are no longer attracted by the brake magnets. The frictional forces thus caused entail the benefit of an additional braking effect. Wear and tear of the brake magnets possibly caused by the evolving friction can be reduced by the installation of gliding plates.

BRIEF DESCRIPTION OF THE DRAWINGS

The invention is explained in greater detail as set forth below by means of an embodiment and based on the drawings enclosed hereto, wherein.

DETAILED DESCRIPTION OF THE PREFERRED EMBODIMENTS

Figure 1:
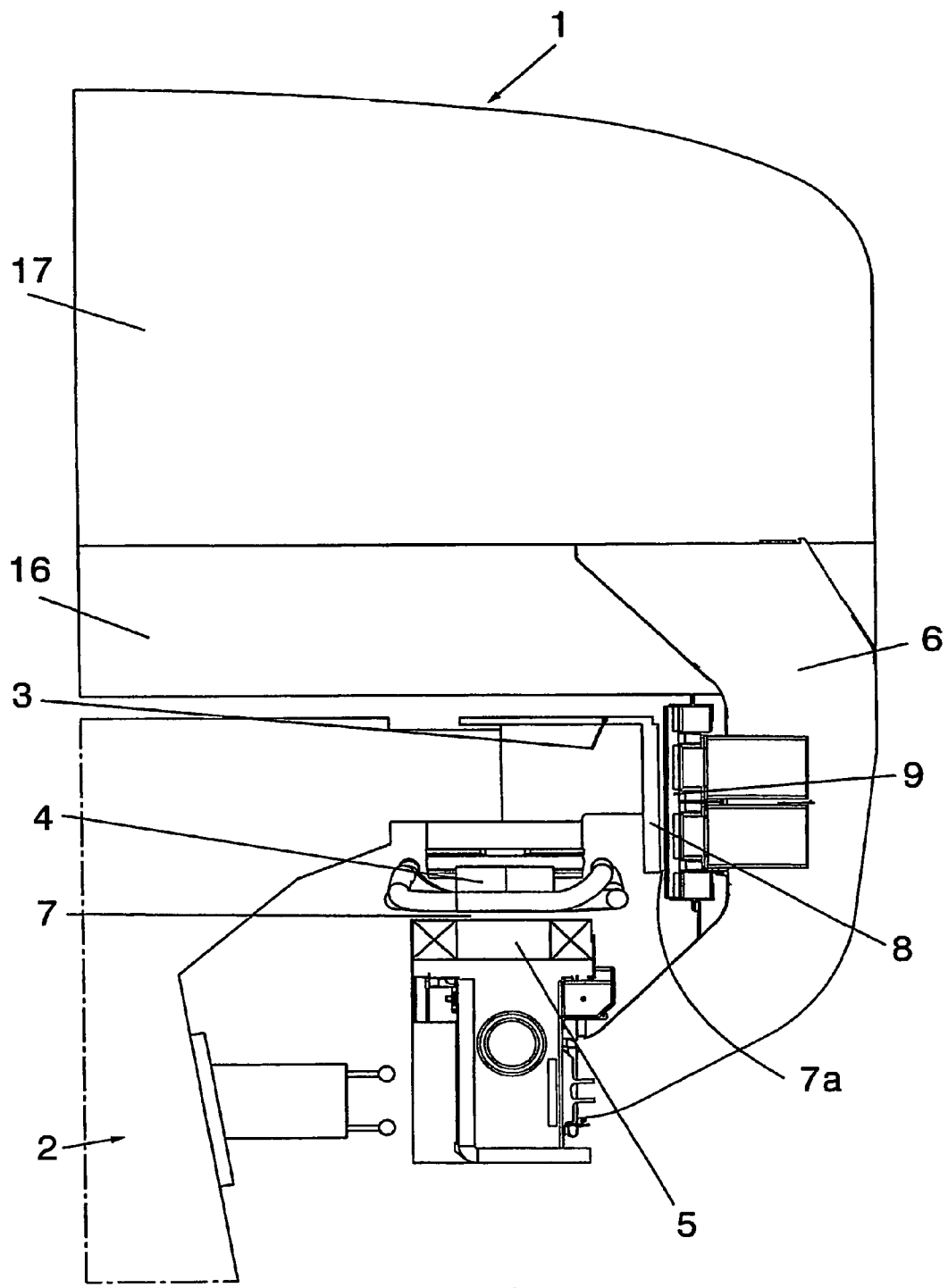
FIG. 1 schematically shows a partial section through a usual magnetic levitation railway.

FIG. 1 schematically shows a cross-section through a magnetic levitation vehicle 1 which is conventionally movably mounted on a guideway extending in longitudinal direction of a route, said guideway being comprised of supports 2 made of steel and/or concrete as well as guideway plates 3 mounted on it. The propulsion of the magnetic levitation vehicle 1 is effected, for example, by a long stator motor which comprises stator packets 4 affixed underneath said guideway plates 3 and arranged consecutively in the longitudinal direction thereof. The stator packets 4 have alternatingly succeeding teeth and grooves not shown here, into which windings are inserted that are fed with a three-phase current of a variable amplitude and frequency. The actual excitation field of the long stator motor is generated by at least one carrying magnet 5 which is affixed by at least one lateral support bracket 6 to said magnetic levitation vehicle 1 and which has magnet poles facing the downwardly open grooves of stator packets 4 as shown in FIG. 1. The carrying magnet 5 not only provides the excitation field, but also fulfils the function of carrying and levitating by maintaining a given support gap 7 of e.g. 10 mm between said carrying magnet 5 and said stator packets 4 during operation of the magnetic levitation vehicle 1.

For a proper guidance of the magnetic levitation vehicle 1 on the track, the guideway plates 3 are provided with laterally affixed reaction and/or guide rails 8, which are faced by guiding magnets 9 also mounted to the support brackets 6 and serving for maintaining a gap 7a corresponding to gap 7 between itself and the reaction rail 8 during operation of the vehicle. As shown on FIG. 1, the carrying magnet 5 and the guiding magnet 9 each form a module affixed to the support bracket 6, each comprising a magnet arrangement for the functions of "carrying" and "guiding". However, it is obvious that a plurality of such modules can be mounted at the magnetic levitation vehicle 1 in lateral arrangement side by side and one behind the other, viewed in the direction of travel. Each module is preferably provided with a magnet back box, by way of which it is fastened to the support brackets 6, which in turn are connected with a bend-proof understructure or suspension frame 16 comprising longitudinal and transverse braces on which a car body 17 of said magnetic levitation vehicle 1 (FIG. 1) equipped with a passenger cell is supported.

Magnetic levitation vehicles 1 and their magnet arrangements are generally known to an expert, e.g. through printed publications U.S. Pat. No. 4,698,895, DE 39 28 277 C1, and PCT WO 97/30504 A1, which for the sake of simplicity are made a part of the present disclosure by reference.

Figure 2:
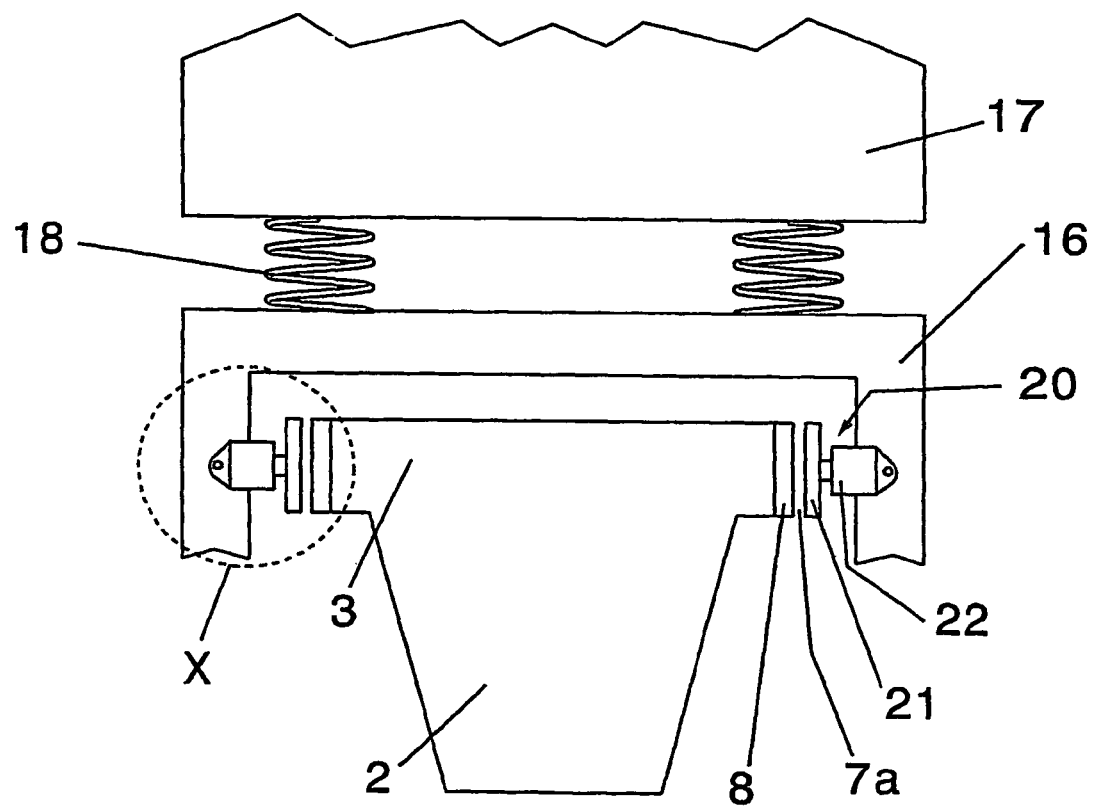
FIG. 2 shows a front view of part of the magnetic levitation railway according to FIG. 1 in a magnified scale.

For the sake of simplicity, FIG. 2 just shows the suspension frame 16 and the car body 17 supported on it, for example, by means of springs 18. At least one eddy-current brake 20 each is provided at the inside of said suspension frame 16 at the level of the reaction rail 8. In particular, brake 20 contains a brake magnet 21 which is stationary or pivotally fastened by means of at least one holder 22 to the suspension frame 16 and whose mode of operation is explained further below.

Figure 3:
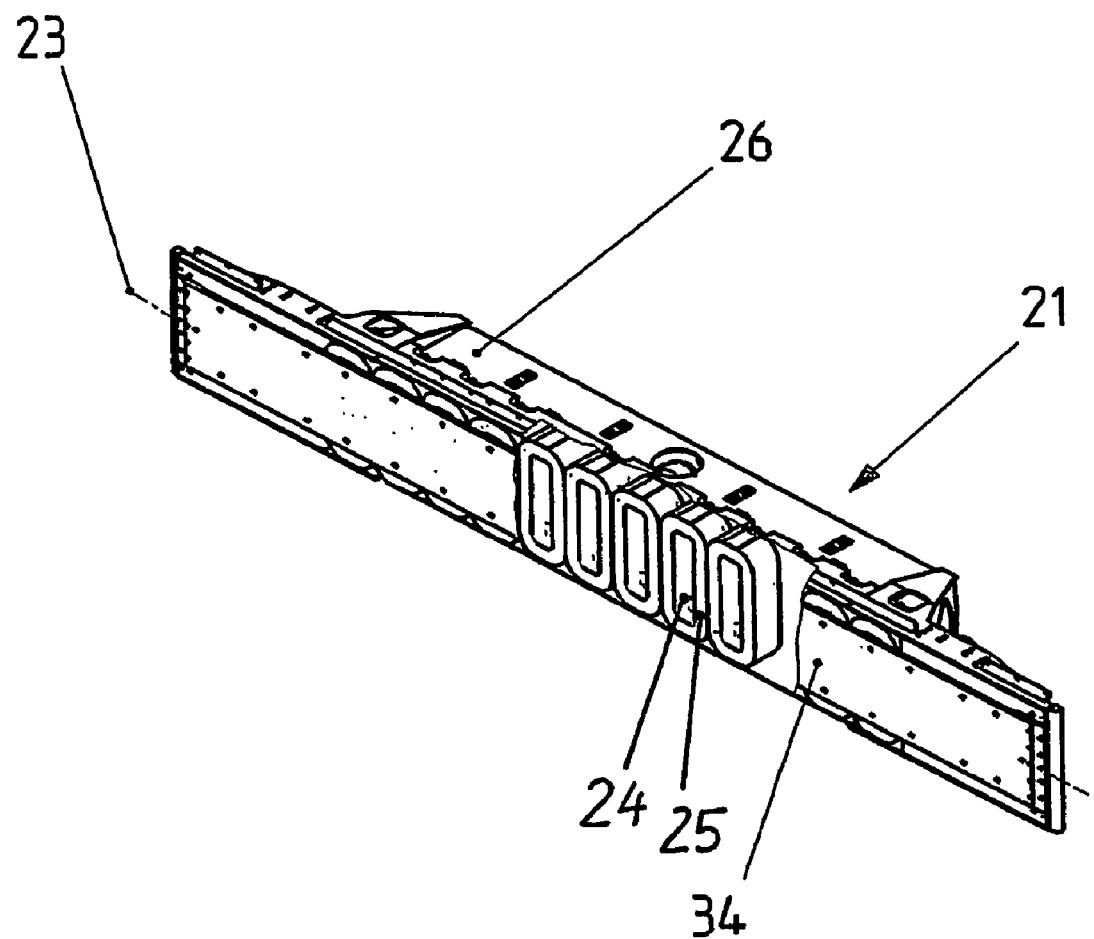
FIG. 3 shows the brake magnet of an eddy-current brake for a magnetic levitation vehicle of the magnetic levitation railway according to FIG. 1 in a perspective view.

The brake magnet 21 is shown in an enlarged view in FIG. 3. In the direction of a longitudinal axis 23, it comprises 5 magnet poles, each of which contain an iron core 24 not shown here in detail as well as a winding 25 which surrounds it. The various windings 25 of the brake magnet 21 are electrically connected in series and connected to a direct voltage source in a manner that is not shown here in detail. The sense of coiling of the windings 25 has been so pre-selected that the magnet poles alternately form north poles and south poles as an electrical current is passed through. The individual iron cores 24 are preferably connected to each other by pole backs body box shown here, and the whole number of magnet poles is affixed to a magnet back box 26, which for example serves for fixing the brake magnet 21 to the magnetic levitation vehicle, as shown on FIG. 2. The number of magnet poles can actually be chosen at will. In the embodiment, there are twelve magnet poles.

Besides, the brake magnet 21 with its longitudinal axis 23 is arranged in parallel to the reaction rail 8 and arranged in such a way that its magnet poles usually stand opposite to the reaction rail 8 at a distance that mainly corresponds to the gap 7a on FIG. 1 and FIG. 2. Viewed in the direction of the longitudinal axis 23, the guiding magnets 9 and brake magnets 21 may alternate in a pre-selected sequence.

Figure 4:
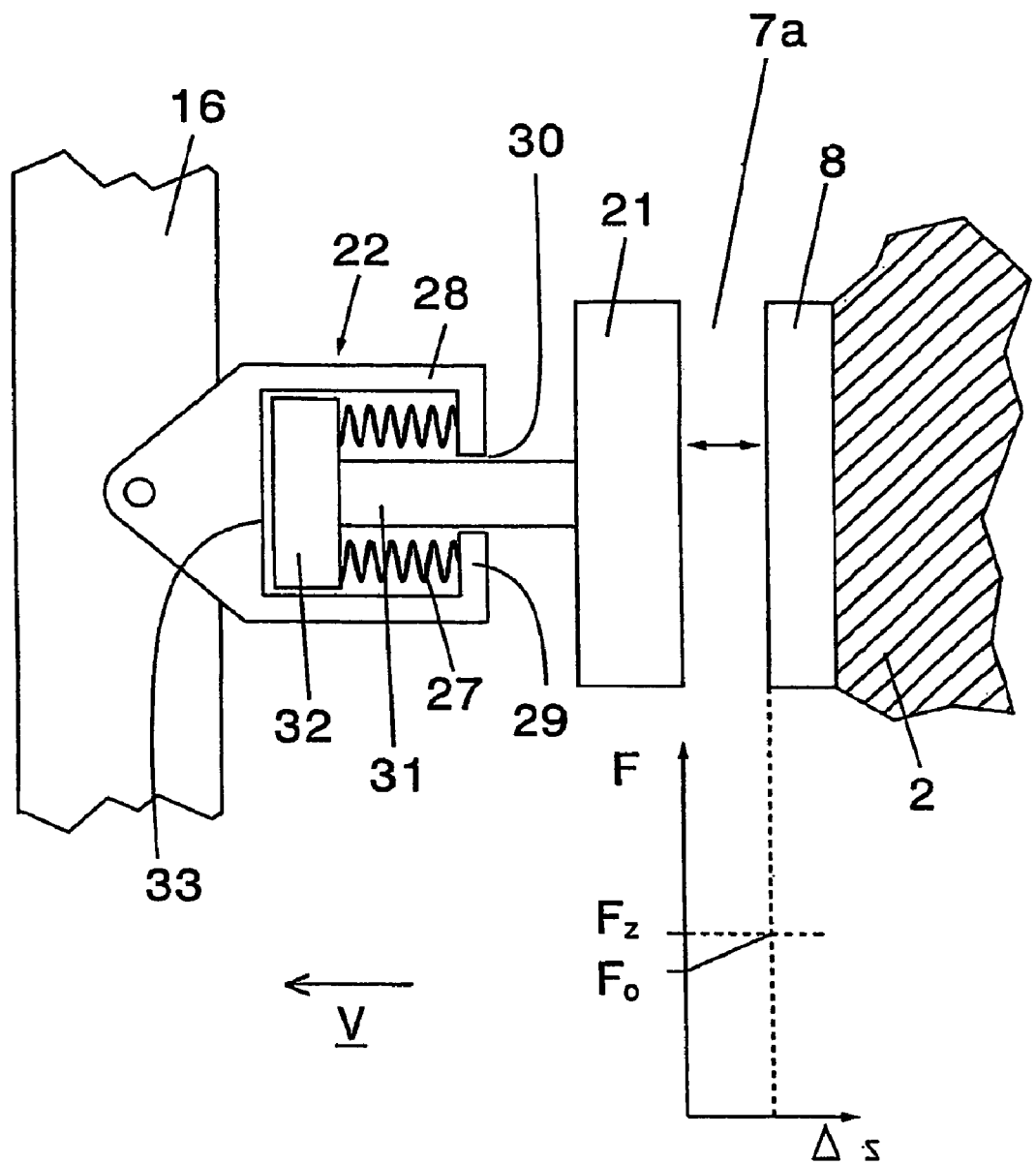
FIG. 4 schematically shows the inventive assembly of a brake magnet of the eddy-current brake according to FIG. 2 on a magnetic levitation vehicle in an enlarged detail X of FIG. 2.

According to the present invention, the brake magnet 21, as is particularly shown on FIG. 4, is movably held by at least one spring 27 at the magnetic levitation vehicle, i.e. in this case at the suspension frame 16 thereof. This spring 27 may for example be a rubber, spiral, or helical compression-type spring. For this purpose, the holder 22 according to FIG. 4 is designed and built as a hollow body 28 which in a front wall 29 has an opening 30 that points to the reaction rail 8, with a rod 31 being accommodated in said opening in a slidable arrangement. At one end protruding from this opening 30, said rod 31 carries the brake magnet 21, whereas at its other end it is provided with a piston 32 accommodated in said hollow body 28 in a slidable arrangement. With its broad side facing the reaction rail 8, said piston 32 is supported on one end of the spring 27, the other end of which is supported on the front wall 29. Thereby, the spring 27 presses the piston 32 and along with it the brake magnet 21 in the direction of an arrow v vertically away from the reaction rail 8 until the piston 32, for example, rests against a rear wall 33 of said hollow body 28. On account of this arrangement, the brake magnet 21 can be moved against the pre-tensioning force of said spring 27 in a direction that is opposite to said arrow v. The arrangement has been chosen this way to ensure that the possible stroke of said piston 32 is at least equal to the magnitude $\Delta s$ (FIG. 4) of the gap 7a. The brake magnet 21, therefore, can be made to abut against the force of spring 27 and, by bridging the gap 7a, the reaction rail 8. Moreover, the pre-tensioning force of spring 27 when being in its assembled status according to FIG. 4, has been properly chosen to ensure that the brake magnet 21 is made to abut the reaction rail 8 when opposite to the arrow v a force is applied on it which corresponds to an admissible force Fz. This is schematically shown in the bottom part of FIG. 4 by way of a graphical representation, in which the way is plotted along the abscissa and in which the force acting on the brake magnet 21 is plotted along the ordinate.

The mode of operation of the described brake magnet 21 is as follows:

During a normal travel of the magnetic levitation vehicle at high speed, the windings 25 (FIG. 3) are de-energized. Therefore, the brake magnet 21 is ineffective. If braking, especially an emergency braking, is required, a direct current, e.g. 80 A, is passed through the windings 25, whereby eddy-currents in the reaction rail 8 consisting of an electrically conductive material are generated because of the high travel speed of the magnetic levitation vehicle 1. On the one hand, these eddy currents entail the desired braking effect in the travelling direction of the magnetic levitation vehicle (=longitudinal direction 23). On the other hand, a normal force becomes active which is effective in parallel to the arrow v and directed vertically to the reaction rail 8, which results from the magnetic attraction force of the individual magnet poles and which is comparably small at high travel speeds. With a brake magnet 21 that is rigidly mounted to the magnetic levitation vehicle 1, the reaction rail, therefore, would be attracted only weakly to the brake magnet 21 in the direction of arrow v.

However, as the speed of the magnetic levitation vehicle 1 gets slower, the normal force as described hereinabove becomes greater and greater, especially if the electric current through the windings 25 is so regulated that a constant braking force is obtained. In the process, the normal force may become so great that the forces exerted on the reaction rails 8 lead to a permanent damage of its fixing points at the drive way.

According to the present invention, it is at this point where the spring 27 starts to become active. As shown by the characteristic curve in FIG. 4, the brake magnet 21 is ever more moved in the direction of the reaction rail 8 as the normal force becomes greater, until it hits against the reaction rail 8, which is not shown in detail on FIG. 4. Thereby, the normal force acting on the reaction rail 8 is abolished. The frictional force which starts to become active instead thereof at speeds of for example under 100 km/h will then render an additional contribution to the braking efficiency. Damage to the magnet poles of the brake magnet 21 is preferably prevented according to the present invention by laying a gliding plate 34 (FIG. 3) made of a well glidable material on the side of the brake magnet 21 that faces the reaction rail 8.

An advantage which becomes evident from FIG. 4 lies in that the reaction rail 8 and/or its fixing points at the driveway 2 are not burdened any longer as soon as the brake magnet 21 rests against the reaction rail 8. It is thereby possible to rate the pre-tensioning force of the spring 27 properly in order not to exceed the pull-out force of the reaction rail 8 even if the brake magnet 21 is fully switched-on, i.e. to ensure that the mechanical load of the reaction force 8 will always remain under a critical and/or admissible value also when the brake magnet 21 does not abut or not yet abut.

Another advantage of the invention lies in that the application of the brake magnet 21 to the reaction rail 8 is done automatically and that it is not necessary to provide a special control for this purpose. Moreover, the force of the spring 7 can easily be chosen so as to ensure that the reset forces caused by it remain smaller than the pre-determined pull-out forces for the reaction rail 8. In the process, the spring load characteristic curve takes a comparably flat course so that the movement stroke of the brake magnet 21 does not commence until a minimal normal force Fo is reached.

The invention is not limited to the described embodiment that can be diversified in a plurality of ways. In particular, a plurality of springs 27 can be utilized instead of one spring 27, as shown on FIG. 4. The mounting of the springs 27 and the coupling of the holder 22 to the magnetic levitation vehicle and/or its levitating frame 16, too, can largely be chosen at will. In particular, more than just one holder 22 can be provided per brake magnet 21. Furthermore, it is clear that the brake magnet 21 supported as described in the present invention could be provided at both sides of the travel way and/or of the vehicle (1), as shown on FIG. 2. Moreover, several brake magnets of the described brake magnets 21 can be arranged in the longitudinal direction of the vehicle either one behind the other or in alternation with the guiding magnets 9 (FIG. 1). Finally it is self-explanatory that the different materials can also be applied in combinations other than those described and shown hereinabove.

The invention claimed is:

1. A magnetic levitation railway, comprising:
   a driveway (2, 3) having a reaction rail (8); and
   a vehicle (1) being movably arranged on the driveway in parallel to said reaction rail (8) and being provided with an eddy-current brake (20), said eddy-current brake (20) having at least one brake magnet (21) destined to cooperate with the reaction rail (8) and to keep a certain distance to said reaction rail, said at least one brake magnet (21) having at least one magnet pole provided with a winding (25), said magnet pole developing apart from a braking force acting in the direction of travel also a normal force acting vertically to the reaction rail (8) and depending on the travel speed when said winding (25) is excited,
   wherein said brake magnet (21) includes a gliding plate (34) and movably mounted to the vehicle (1) and transversely to the reaction rail (8) in such a manner that said at least one brake magnet (21) abuts said reaction rail (8) with said gliding plate (34) when a normal force exceeds a pre-determined value, wherein a frictional force occurring as soon as the at least one brake magnet (21) rests against the reaction rail (8) renders an additional braking effect, and wherein said gliding plate (34) covers said windings of said brake magnet (21).

2. A magnetic levitation railway according to claim 1, wherein the abutment of the brake magnet (21) to the reaction rail (8) is done automatically.

3. A magnetic levitation railway according to claim 1, wherein the brake magnet (21) is held by at least one pretensioned spring (27) to said vehicle (1).

4. A magnetic levitation railway according to claim 3, wherein said spring (27) when said brake magnet (21) abuts said reaction rail (8) exerts a reset force on the brake magnet (21) being smaller than a pre-determined pull-out force for said reaction rail (8).

5. A magnetic levitation railway according to claim 3, wherein said spring (27) has a flat spring load characteristic curve.

6. A magnetic levitation vehicle for magnetic levitation railways, wherein said vehicle is equipped with an eddy-current brake (20), said eddy-current brake (20) having at least one brake magnet (21) destined to cooperate with the reaction rail (8) and to keep a certain distance to said reaction rail, said brake magnet (21) having at least one magnet pole provided with a winding (25), said magnet pole developing apart from a braking force acting in the direction of travel also a normal force acting vertically to the reaction rail (8) and depending on the travel speed when said winding (25) is excited,
   wherein said brake magnet (21) includes a gliding plate (34) and movably mounted to the vehicle (1) and transversely to the reaction rail (8) in such a manner that said at least one brake magnet (21) abuts said reaction rail (8) with said gliding plate (34) when a normal force exceeds a pre-determined value, wherein a frictional force occurring as soon as the at least one brake magnet (21) rests against the reaction rail (8) renders an additional braking effect, and wherein said gliding plate (34) covers said windings of said brake magnet (21).

\* \* \* \* \*